United States Patent Office 2,995,568
Patented Aug. 8, 1961

2,995,568
THIOPHOSPHORIC ACID ESTERS
Hugo Malz, Leverkusen, Otto Bayer, Leverkusen-Bayerwerk, and Richard Wegler, Leverkusen, Germany, assignors to Farbenfabriken Bayer Aktiengesellschaft, Leverkusen, Germany, a corporation of Germany
No Drawing. Filed Jan. 19, 1959, Ser. No. 787,333
20 Claims. (Cl. 260—326.5)

The present invention relates to and has as its objects thiophosphoric acid esters and their production. The new compounds of the present invention generally may be represented by the following formula $$(RO)_2P(S)(O)-S-NR_1R_2$$

in which R stands for alkyl or aryl radicals, $R_1$ stands for the radicals $$-\overset{O}{\underset{\|}{C}}-X,\ -\overset{O}{\underset{\|}{\underset{O}{S}}}-X,\ -\overset{O}{\underset{\|}{C}}-OX,\ -\overset{O}{\underset{\|}{C}}-N(X)_2,\ -C\equiv N$$

wherein X stands for same or different alkyl or aryl radicals and $R_2$ stands for the same or a different radical $R_1$ in case of $R_1$ $$=-\overset{O}{\underset{\|}{C}}-X$$

and $$-SO_2-X$$

or for hydrogen, alkyl or aryl radicals; $R_1$ and $R_2$ furthermore may form the radical of a cyclic dicarboxylic acid imide or a cyclic carboxylic sulfonic acid radical.

The reaction of diesters of thiol- or thionothiol-phosphoric acids or their salts with compounds containing reactive halogen attached to carbon is well known in the literature. In this way, triesters of the general formula $$(RO)_2P(O(S))-S-R'$$

wherein R and R' are hydrocarbon radicals, are obtainable.

It has now been found that the aforesaid diesters of thiol- or thionothiolphosphoric acid or their salts may also be reacted with N-halo-amides or -imides of organic carboxylic or sulfonic acids as it is to be seen from the following formulae:

$$\underset{RO}{\overset{RO}{\diagdown}}P(S(O))-S-Me+Hal-N(R_1R_2) \longrightarrow (RO)_2P(S(O))-S-NR_1R_2$$

The symbols in these formulae have the same significance as given above. More specifically R in the above said formulae may be a lower alkyl, cyclo alkyl or phenyl radical, $N(R_1R_2)$ more specifically may be the radical of a carboxylic acid amide, dicarboxylic acid imide, sulfonic acid amide, disulfonic acid imide, carboxy-sulfonic acid imide, carbodiimide, urea, urethane, hydantoin, amidine, cyanamide, guanidine, and the like.

The above shown reaction is surprising since it was to be expected that N-halo-amides or -imides, being compounds with a positively induced halogen, would have an oxidizing effect on the thiol group of thiol- or dithiophosphoric acid esters which are rather sensitive to oxidation. Thus, dithiophosphoric acid esters of the above mentioned type are, for example, readily converted by free halogen into the corresponding disulfides:

$$(RO)_2P(S)-S-S-P(S)(RO)_2$$

(cf. for example B. H. Ping-Fang and C. Wan-Yi: Acta chim. sinica 22 1956, page 213 ff.), whilst, on the other hand N-chloro-succinimide easily converts alcohols into the corresponding carbonyl compounds (cf., for example, Houben-Weyl, vol. VII/1, page 185).

For the reaction according to the invention there are particularly suitable the alkali metal salts of thiol- or thiolthiono-phosphoric acid-O.O-diesters which are chiefly reacted in a finely divided dispersion or solution in inert solvents such as hydrocarbons, halogenated hydrocarbons, tertiary alcohols or ethers, with the N-halocarboxy- or -N-halo-sulfonic-amides or -dicarboxy imides, -carboxy sulfonimides, -disulfonimides or -carbodiimides and the like or with solutions thereof in inert solvents of the aforesaid type.

The O.O-diesters of thiol- or thiolthiono-phosphoric acid to be used as starting materials or their salts as well as the above mentioned N-haloamido or -imido compounds are known by themselves or are easily obtainable by the known methods for preparing the known compounds.

The new phosphoric acid esters are intended to be used as pest control agents as well as in the rubber industry.

The new compounds of the present invention very effectively kill insects like flies, mites, aphids, etc. They distinguish themselves especially by a good contact-insecticidal activity and sometimes by an activity on eating insects such as caterpillars. Most surprisingly they are of remarkably low toxicity against mammals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As an example for the special utility of the inventive compounds the compounds of the following formulae

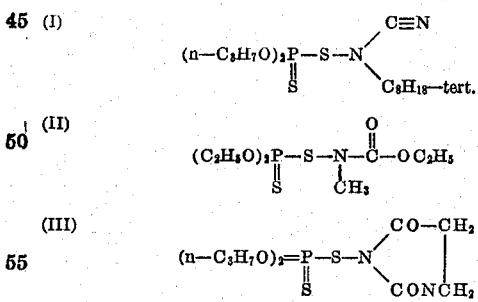

have been tested against flies (Drosophila) and spider mites (*Tetranychus telarius althae*). Aqueous solutions have been prepared by admixing the above shown compounds with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) *Against flies (Drosophila).*—In petri dishes of about 5 inches diameter filter paper has been placed, which has been wetted with aqueous solutions of the above shown active ingredients I and II prepared as indicated above. About 30 flies have been placed under the covered petri dishes and the living status has been determined after 24 hours. The following results were obtained:

| Compound | Aqueous concentration (in percent active ingredient/water) | Killing rate (in percent) |
|---|---|---|
| (I) | 0.2 | 100 |
| (II) | 0.2 | 100 |

(b) *Against spider mites (Tetranychus telarius althate).*—Bean plants (*Phaseolus vulgaris*) of about 15 inches height are sprayed drip wet with aqueous solutions of the above shown active ingredients I and III prepared as indicated above. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
|---|---|---|
| (I) | 0.2 | 100 |
| (II) | 0.2 | 100 |

The compound of the following formula (IV)  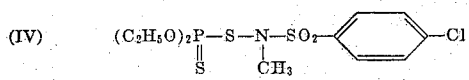

has an excellent fungicidal activity and inhibits the growth of *Phytophthora infestans* on tomatoes in concentrations of 0.0001% to 100%.

The compound of the first mentioned Formula I also has shown good nematicidal activity against Meloidogyne spec.; in a concentration of 100 parts per million in the soil the above said nematodes were killed to 80% and with 200 parts per million complete killing was obtained.

The following examples are given for the purpose of illustrating the invention.

*Example 1*

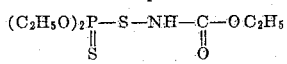

42 grams (somewhat more than ⅕ mol) of the sodium salt of O.O-diethyl-thiolthiono-phosphoric acid are suspended in about 500 millilitres of dry benzene. A solution of 24.8 grams (⅕ mol) of N-chlorurethane in 150 millilitres of dry benzene is added dropwise with stirring to this suspension. In a moderately exothermic reaction (reaction temperature about 35° C.) the benzene-insoluble sodium salt of O.O-diethyl-thiolthiono-phosphoric acid gradually disappears from the reaction mixture and a finely divided sodium chloride precipitate begins to separate out. The mixture is after-stirred for some time (about 2 hours) and the precipitated common salt is separated off. The solvent is removed from the clear filtrate by evaporation under vacuum. A residue of a pale yellow clear oil is thus obtained which crystallizes after some time. The crystalline product is freed from uncrystallized portions by filtering with suction or squeezing dryly and then redissolved from hot light benzene. Colorless crystals of melting point 71–73° C. are thus obtained.

Calculated for $C_7H_{16}O_4NPS_2$: C, 30.76%; H, 5.90%; N, 5.13%; P, 11.33%; S, 23.46%. Found: C, 31.17%; H, 5.94%; N, 5.20%; P, 11.3%; S, 24.3%.

By the same way but using instead of the sodium salt of O.O-diethyl-thiolthionophosphoric acid the equimolecular amount of the sodium salt of O.O dimethyl-thiolphosphoric acid there is obtained the compound of the following formula

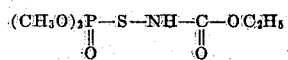

*Example 2*

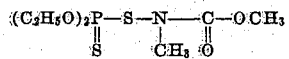

By reacting a benzenic solution of 24 grams of N-chloro-N-methyl urethylane on a suspension or 42 grams of the sodium salt of O.O-diethyl-thiolthiono-phosphoric acid in benzene in the manner described in Example 1 there is obtained a light brown clear oil as reaction product which crystallizes after prolonged standing in a mixture of ice and common salt. At temperatures of between 5 and 8° C. the product becomes again liquid.

Calculated for $C_7H_{16}O_4NPS_2$: C, 30.76%; H, 5.90%; N, 5.13%; P, 11.33%; S, 23.46%. Found: C, 33.1%; H, 5.8%; N, 4.6%; P, 11.1%; S, 23.2% (crude product).

*Example 3*

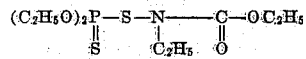

To a suspension of 32 grams of the sodium salt of O.O-diethyl-thiolthionophosphoric acid in 250 millilitres of benzene there is added dropwise with stirring a solution of 22.7 grams of N-chloro-N-ethylurethane in 100 millilitres of benzene. A reaction temperature of 25–30° C. is maintained by appropriate cooling with water. While the sodium salt of the dithio-phosphoric acid ester slowly disappears from the reaction mixture, a finely disperse sodium chloride precipitate separates out which is separated off after further stirring for about 1 hour. The clear pale yellow benzene solution is concentrated under vacuum, until the solvent is completely removed. A clear brownish oil is thus obtained as residue which does not crystallize, even upon prolonged cooling with a mixture of ice and common salt.

Calculated for $C_9H_{20}O_4NPS_2$: C, 35.87%; H, 6.69%; N, 4.65%; P, 10.28%; S, 21.28%. Found: C, 36.34%; H, 6.81%; N, 4.49%; P, 9.5%; S, 20.9%.

By the same way but using instead of N-chloro-N-ethylurethane the equimolecular amount of N-chloro-N-phenyl-urethane there is obtained the compound of the following formula

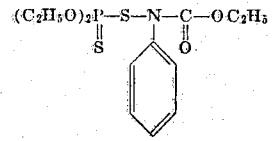

*Example 4*

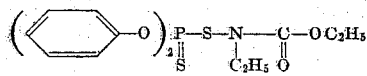

In a manner corresponding to that described in Example 3, a suspension of 32 grams of the potassium salt of O.O-diphenyl-thiolthiono-phosphoric acid in 250 millilitres of benzene is reacted with a solution of 15.2 grams of N-chloro-N-ethylurethane in 100 millilitres of benzene. After separating off the precipitated potassium chloride and removing the solvent under vacuum, a non-crystallizable brownish oil is obtained as residue.

Calculated for $C_{17}H_{20}O_4NPS_2$: C, 51.37%; H, 5.07%; N, 3.52%; P, 7.79%; S, 16.13%. Found: C, 51.28%; H, 5.35%; N, 3.60%; P, 7.65%; S, 16.0%.

Example 5

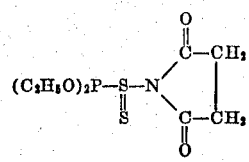

Into a suspension of 21 grams of the sodium salt of O.O-diethyl-thiolthiono-phosphoric acid in 300 millilitres of benzene are introduced in small portions with stirring 13.4 grams of N-chloro-succinimide. In the course of the slightly exothermic reaction the chlorimide as well as the sodium dithiophosphate gradually disappear from the reaction mixture and a finely disperse sodium chloride precipitate separates out. In order to complete the reaction, the mixture is heated to about 50° C. for a further ¼ hour. The precipitated sodium chloride is separated off from the cold reaction mixture and the clear colorless benzene solution is concentrated under vacuum, until the solvent is completely removed. A colorless smeary residue is thus obtained which crystallizes after a short time. The crystals are squeezed dryly and recrystallized from hot alcohol. They then show a melting point of 94.5–96° C.

Calculated for $C_8H_{14}O_4NPS_2$: C, 33.92%; H, 4.98%; N, 4.94%; P, 10.93%; S, 22.64%. Found: C, 34.15%; H, 5.37%; N, 5.08%; P, 10.8%; S, 22.35%.

By the same way but using instead of N-chloro-succinimide the equimolecular amount of N-chloro-phthalimide there is obtained the compound of the following formula

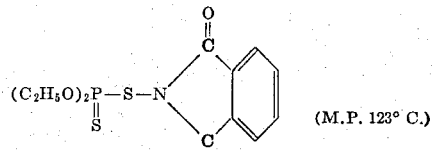

(M.P. 123° C.)

Example 6

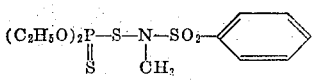

To a suspension of 22 grams of the sodium salt of O.O-diethyl-thiolthionophosphoric acid in 250 millilitres of benzene there is added dropwise with stirring a solution of 20.6 grams of N-chloro-N-methyl-benzene-sulfonic acid amide in 100 millilitres of benzene. The reaction proceeds similarly to that described in Examples 1 to 5. In order to complete the slightly exothermic reaction, the mixture is after-stirred at 45–50° C. for ¼ hour. The precipitated sodium chloride is separated off from the reaction mixture and the benzene solution concentrated under vacuum. After complete removal of the solvent, a viscous light brown oil remains behind which crystallizes after prolonged standing (for several hours) or upon rubbing with light benzene. After re-crystallization from hot petroleum ether, the colorless crystals show a melting point of 65° C.

Calculated for $C_{11}H_{18}O_4PS_3N$: C, 37.17%; H, 5.11%; N, 3.94%; P, 8.71%; S, 27.06%. Found: C, 37.9%; H, 5.32%; N, 4.13%; P, 8.5%; S, 26.1%.

By the same way but using instead of N-chloro-N-methyl-benzene-sulfonic acid amide the equimolecular amount of N-chloro-N-methyl-p-toluene sulfonic acid amide there is obtained the compound of the following formula

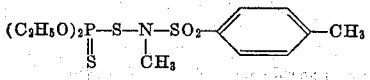

By the same way but using instead of N-chloro-N-methyl-benzene-sulfonic acid amide the equimolecular amount of N-chloro-N-methyl-methane sulfonic acid amide there is obtained the compound of the following formula $(C_2H_5O)_2P—S—N—SO_2—CH_3$
       ‖    |
       S   CH₃

Example 7

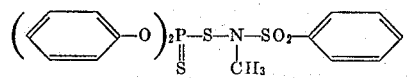

In a similar manner to that described in Example 6 a suspension of 32 grams of the potassium salt of O.O-diphenyl-thiolthiono-phosphoric acid in 300 millilitres of benzene are reacted with a solution of 20.6 grams of N-chloro-N-methylbenzene-sulfonic acid amide in 150 millilitres of benzene. Upon concentration of the benzene solution freed from the precipitated potassium chloride, under vacuum, a light brown oil remains behind which crystallizes on rubbing with methanol. After squeezing dryly, the colorless crystals are de-dissolved from hot methanol. M.P. 92–94° C.

Calculated for $C_{19}H_{18}O_4NPS_3$: C, 50.54%; H, 4.02%; N, 3.10%; P, 6.86%; S, 21.31%. Found: C, 50.52%; H, 4.01%; N, 3.18%; P, 6.9%; S, 21.8%.

Example 8

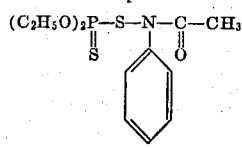

In the manner described in Example 1, a suspension of 22.4 grams of the potassium salt of O.O-diethyl-thiolthionophosphoric acid in 250 millilitres of dry benzene is reacted with a solution of 16.9 grams of N-chloro-acetanilide in 150 millilitres of benzene. After separating off the potassium chloride formed in the course of the reaction, the clear filtrate is concentrated under vacuum. Upon cooling, the residual light brown oil solidifies to form a crystalline mass which, after re-crystallization from petroleum ether, shows a melting point of 60–62° C.

Calculated for $C_{12}H_{18}O_3NPS_2$: C, 45.13%; H, 5.68%; N, 4.38%; P, 9.7%; S, 20.08%. Found: C, 46.0%; H, 5.97%; N, 4.4%; P, 9.9%; S, 19.3%.

By the same way but using instead of N-chloro-acetanilide the equimolecular amount of N-chloro-N-methyl-benzamide there is obtained the compound of the following formula

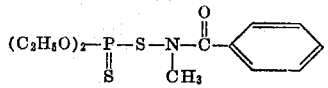

Example 9

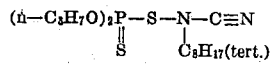

A suspension of 25.5 grams of the potassium salt of O.O-di-n-propyl-thiolthiono-phosphoric acid in 250 millilitres of benzene is reacted in a similar manner to that described in the preceding examples with a solution of 18.5 grams of N-chloro-tert.-octyl-cyanamide in 150 millilitres of benzene. After removal of the solvent under vacuum, a clear fluid pale yellow oil is obtained which does not crystallize even upon cooling.

Calculated for $C_{15}H_{31}O_2N_2PS_2$: C, 49.15%; H, 8.53%; N, 7.64%; P, 8.45%; S, 17.50%. Found: C, 49.11%; H, 8.52%; N, 7.95%; P, 8.55%; S, 17.3%.

Example 10

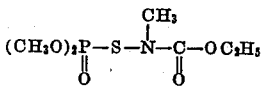

17 grams of the sodium salt of O.O-dimethyl-thiolphosphoric acid are suspended in 250 millilitres of benzene. To this suspension there is added dropwise with stirring a solution of 13.7 grams of N-chloro-N-methyl-urethane in 50 millilitres of benzene. The temperature of the reaction mixture rises thereby gradually to about 30° C., whilst the sodium-thiolphosphate completely dissolves. In order to complete the reaction, the mixture is after-stirred at 40–50° C. for about 1 hour. The precipitated sodium chloride is filtered off with suction from the cold reaction mixture and the filtrate concentrated by evaporation under vacuum. A colorless to pale yellow oil is thus obtained which is first freed from small portions of insoluble impurities by means of a glass suction-filter and then fractionated under vacuum produced by an oil pump. A colorless water-clear liquid goes over at a pressure of 0.1 mm. Hg and 137–140° C. the analytical composition of which corresponds to the above formula.

Calculated for $C_6H_{14}O_5NPS$: C, 29.63%; H, 5.80%; N, 5.76%; P, 12.74%; S, 13.18%. Found: C, 28.91%; H, 5.3%; N, 5.6%; P, 13.3%; S, 13.45%.

Example 11

$$(CH_3O)_2\underset{\underset{O}{\|}}{P}-S-N\begin{array}{c}CO-CH_2\\ \diagdown\\ CO-CH_2\end{array}$$

A suspension of 17 grams of the sodium salt of O.O-dimethyl-thiol-phosphoric acid is reacted with 13 grams of N-chloro-succinimide as described in Example 5. Upon working up the reaction product, a pale yellow oil is obtained which crystallizes after a short time. The crystal slurry is taken up in hot benzene. The hot solution is treated with an amount of benzene so that a permanent cloudiness just occurs. Upon cooling the solution, a colorless substance crystallizes with a melting point of 90–93° C.

Calculated: $C_6H_{10}O_5NPS$: C, 30.13%; H, 4.21%; N, 5.86%; P, 12.95%; S, 13.40%. Found: C, 30.65%; H, 4.20%; N, 6.01%; P, 12.4%; S, 12.7%.

By the same way but using instead of N-chloro-succinimide the equimolecular amount of N-chloro-saccharine (N-chloro-sulfobenzoic acid imide) there is obtained the compound of the following formula $$(CH_3O)_2-\underset{\underset{O}{\|}}{P}-S-N\begin{array}{c}\overset{O}{\overset{\|}{C}}\\ \diagdown\\ \underset{\underset{O}{\diagdown\diagup}}{\underset{\|}{S}}\end{array}\!\!\!\!\!\benzene$$

Example 12

$$(CH_3O)_2\underset{\underset{O}{\|}}{P}-S-N\begin{array}{c}C\equiv N\\ \diagdown\\ C_8H_{17}(tert.)\end{array}$$

A suspension of 13 grams of the sodium salt of O.O-dimethyl-thiol-phosphoric acid in 250 millilitres of benzene is reacted with a solution of 13.2 grams of N-chloro-tert.-octyl-cyanamide in 50 millilitres of benzene as described in Example 9. Upon working up the reaction product, a clear light reddish brown oil is obtained which does not crystallize at room temperature and is not distillable under the vacuum of an oil pump without decomposition. The analytical composition of the oil corresponds to a compound of the above formula.

Example 13

$$(C_2H_5O)_2\underset{\underset{S}{\|}}{P}-S-N\begin{array}{c}benzene\\ \diagup\\ CH\\ \|\\ O\end{array}$$

A suspension of 22.4 grams of the potassium salt of O.O-diethyl-thiolthiono-phosphoric acid in 250 millilitres of benzene is reacted with a solution of 15.5 grams of N-chloro-formanilide in 150 millilitres of benzene as described in Example 8. Upon working up, an oil residue is obtained which crystallizes on standing. After recrystallization from ethanol, the crystals show a melting point of 53–54° C.

Calculated: $C_{11}H_{16}O_3NPS_2$: C, 43.27%; H, 5.28%; N, 4.59%; P, 10.14%; S, 21.0%. Found: C, 43.36%; H, 5.24%; N, 4.93%; P, 10.2%; S, 21.6%.

We claim:

1. The phosphoric acid ester of the following formula $$(C_2H_5O)_2\underset{\underset{S}{\|}}{P}-S-NH-\underset{\underset{O}{\|}}{C}-OC_2H_5$$

2. The phosphoric acid ester of the following formula $$(C_2H_5O)_2\underset{\underset{S}{\|}}{P}-S-\underset{\underset{CH_3}{|}}{N}-\underset{\underset{O}{\|}}{C}-OCH_3$$

3. The phosphoric acid ester of the following formula $$(CH_3O)_2\underset{\underset{O}{\|}}{P}-S-NH-\underset{\underset{O}{\|}}{C}-OC_2H_5$$

4. The phosphoric acid ester of the following formula $$(C_2H_5O)_2\underset{\underset{S}{\|}}{P}-S-\underset{\underset{CH_3}{|}}{N}-\underset{\underset{O}{\|}}{C}-OC_2H_5$$

5. The phosphoric acid ester of the following formula $$(C_2H_5O)_2\underset{\underset{S}{\|}}{P}-S-N\begin{array}{c}\overset{O}{\overset{\|}{C}}-CH_2\\ \diagdown\\ \underset{\underset{O}{\|}}{C}-CH_2\end{array}$$

6. The phosphoric acid ester of the following formula $$(C_2H_5O)_2\underset{\underset{S}{\|}}{P}-S-\underset{\underset{CH_3}{|}}{N}-SO_2-\!\!\!\!\benzene$$

7. The phosphoric acid ester of the following formula $$(C_2H_5O)_2\underset{\underset{S}{\|}}{P}-S-\underset{\underset{CH_3}{|}}{N}-SO_2-\!\!\!\!\benzene-Cl$$

8. The phosphoric acid ester of the following formula $$(C_2H_5O)_2\underset{\underset{S}{\|}}{P}-S-\underset{\underset{\benzene}{|}}{N}-\underset{\underset{O}{\|}}{C}-CH_3$$

9. The phosphoric acid ester of the following formula $$(C_2H_5O)_2\underset{\underset{S}{\|}}{P}-S-\underset{\underset{CH_3}{|}}{N}-\underset{\underset{O}{\|}}{C}-\!\!\!\benzene$$

10. The phosphoric acid ester of the following formula $$(n-C_3H_7O)_2\underset{\underset{S}{\|}}{P}-S-N\begin{array}{c}C\equiv N\\ \diagdown\\ C_8H_{17}(tert.)\end{array}$$

11. The phosphoric acid ester of the following formula $$(CH_3O)_2\underset{\underset{O}{\|}}{P}-S-\underset{\underset{CH_3}{|}}{N}-\underset{\underset{O}{\|}}{C}-OC_2H_5$$

12. The phosphoric acid ester of the following formula $$(CH_3O)_2\underset{\underset{O}{\|}}{P}-S-N\begin{array}{c}CO-CH_2\\ \diagdown\\ CO-CH_2\end{array}$$

13. The phosphoric acid ester of the following formula $$(CH_3O)_2\underset{\underset{O}{\|}}{P}-S-N\begin{array}{c}C\equiv N\\ \diagdown\\ C_8H_{17}(tert.)\end{array}$$

14. A phosphoric acid ester of the following formula

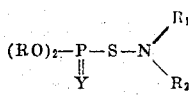

in which Y is a chalcogen having an atomic weight from 16 to 33; R is a member selected from the group consisting of lower alkyl and phenyl radicals; $R_1$ is a member selected from the group consisting of lower alkyl carbonyl, phenyl carbonyl, tolyl carbonyl, chlorophenyl carbonyl, lower alkoxy carbonyl, lower alkyl sulfonyl, phenyl sulfonyl, chlorophenyl sulfonyl, and cyano; $R_2$ is a member selected from the group consisting of hydrogen, $-(CH_2)_nH$, wherein $n$ is a whole number from 0 to 10, phenyl and a group as $R_1$; and $R_1$ and $R_2$ taken together with —N is a radical selected from the group consisting of succinimido, phthalimido and sulfobenzimido.

15. A compound of claim 14 wherein R is lower alkyl, $R_1$ is lower alkoxy carbonyl and $R_2$ is $-(CH_2)_nH$ wherein $n$ is a whole number from 0 to 10.

16. A compound of claim 14 wherein R is lower alkyl, $R_1$ is lower alkyl carbonyl and $R_2$ is phenyl.

17. A compound of claim 14 wherein R is lower alkyl, $R_1$ is cyano, and $R_2$ is $-(CH_2)_nH$ wherein $n$ is a whole number from 0 to 10.

18. A compound of claim 14 wherein R is lower alkyl and $R_1$ and $R_2$ together with —N is succinimido.

19. A compound of claim 14 wherein R is lower alkyl, $R_1$ is phenyl sulfonyl and $R_2$ is $-(CH_2)_nH$ wherein $n$ is a whole number from 0 to 10.

20. A compound of claim 14 wherein R is lower alkyl, $R_1$ is phenyl carbonyl, and $R_2$ is $-(CH_2)_nH$ wherein $n$ is a whole number from 0 to 10.

References Cited in the file of this patent
UNITED STATES PATENTS 2,891,059    Malz et al. _____ June 16, 1959